US011863453B2

(12) United States Patent
Rangel Augusto et al.

(10) Patent No.: US 11,863,453 B2
(45) Date of Patent: Jan. 2, 2024

(54) DYNAMIC LOAD ADJUSTMENT

(71) Applicant: Cisco Technology, Inc., San Jose, CA (US)

(72) Inventors: Leonardo Rangel Augusto, Burnaby (CA); Grzegorz Boguslaw Duraj, Vancouver (CA); Kyle Andrew Donald Mestery, Woodbury, MN (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/335,401

(22) Filed: Jun. 1, 2021

(65) Prior Publication Data

US 2022/0385579 A1 Dec. 1, 2022

(51) Int. Cl.
*G06F 15/16* (2006.01)
*H04L 47/125* (2022.01)

(52) U.S. Cl.
CPC .................. *H04L 47/125* (2013.01)

(58) Field of Classification Search
CPC ........... H04L 2012/568; H04L 67/1004; H04L 47/125; H04L 67/1008; H04L 67/1012; H04L 67/1029
See application file for complete search history.

(56) References Cited

U.S. PATENT DOCUMENTS

| | | |
|---|---|---|
| 6,144,639 A | 11/2000 | Zhao et al. |
| 7,269,139 B1 | 9/2007 | Williams, Jr. et al. |
| 8,249,917 B1 | 8/2012 | Kassmann et al. |
| 2012/0163175 A1 | 6/2012 | Gupta |
| 2013/0107714 A1 | 5/2013 | Liu |
| 2014/0325072 A1 | 10/2014 | Zhang et al. |
| 2019/0158422 A1 | 5/2019 | Greenwood et al. |
| 2019/0207858 A1 | 7/2019 | Xu et al. |
| 2019/0386915 A1* | 12/2019 | Paul .................. H04L 45/64 |

(Continued)

FOREIGN PATENT DOCUMENTS

| | | | |
|---|---|---|---|
| CN | 101820384 A | * | 9/2010 |
| CN | 109992412 A | * | 7/2019 |

OTHER PUBLICATIONS

Deng, "Task allocation algorithm and optimization model on edge collaboration" (Year: 2020).*

(Continued)

*Primary Examiner* — Oscar A Louie
*Assistant Examiner* — Messeret F Gebre
(74) *Attorney, Agent, or Firm* — Lee & Hayes, P.C.

(57) ABSTRACT

Techniques for dynamically load balancing traffic based on predicted and actual load capacities of data nodes are described herein. The techniques may include determining a predicted capacity of a data node of a network during a period of time. The data node may be associated with a first traffic class. The techniques may also include determining an actual capacity of the data node during the period of time, as well as determining that a difference between the actual capacity and the predicted capacity is greater than a threshold difference. Based at least in part on the difference, a number of data flows sent to the data node may be either increased or decreased. Additionally, or alternatively, a data flow associated with a second traffic class may be redirected to the data node during the period of time to be handled according to the first traffic class.

20 Claims, 9 Drawing Sheets

(56) References Cited

U.S. PATENT DOCUMENTS

| | | |
|---|---|---|
| 2021/0176192 A1 | 6/2021 | Li et al. |
| 2021/0303985 A1 | 9/2021 | Lakshmikantha et al. |
| 2022/0217610 A1 | 7/2022 | Zheng |
| 2022/0360461 A1 | 11/2022 | Raleigh et al. |
| 2022/0385580 A1 | 12/2022 | Rangel Augusto |

OTHER PUBLICATIONS

Hai, "Efficient Load Balancing for Multi-Controller in SDN-based Mission-critical Networks" (Year: 2016).*

J. Yang and Q. Wang, "A Deep Learning Load Forcasting Method Based on Load Type Rcognition," 2018 International Conference on Machine Learning and Cybernetics (ICMLC), Chengdu, China, 2018, pp. 173-177 (Year: 2018).*

Sheng, C., Xiangyu, Z., Ning, W., & Yiqiang, Y. (2019). Research on application of neural network based on cloud computing in power load forecasting doi:http://dx.doi.org/10.1109/ITCA49981.2019.00036 (Year: 2019).*

A. R. Currie, A. Mcconnell, G. P. Parr, S. I. McClean and K. Khan, "Truesource: A True Performance for Hierarchical Cloud Monitoring," 2014 IEEE/ACM 7th International Conference on Utility and Cloud Computing, London, UK, 2014, pp. 980-985, doi: 10.1109/UCC.2014 (Year: 2014).*

Office Action for U.S. Appl. No. 17/335,437, dated Jun. 27, 2022, Augusto, "Dynamic Traffic Class Upgrading", 16 pages.

Office Action for U.S. Appl. No. 17/335,437, dated Jan. 24, 2023, Leonardo Rangel Augusto, "Dynamic Traffic Class Upgrading", 19 pages.

Office Action for U.S. Appl. No. 17/335,437, dated May 30, 2023, Leonardo Rangel Augusto, "Dynamic Traffic Class Upgrading", 19 pages.

* cited by examiner

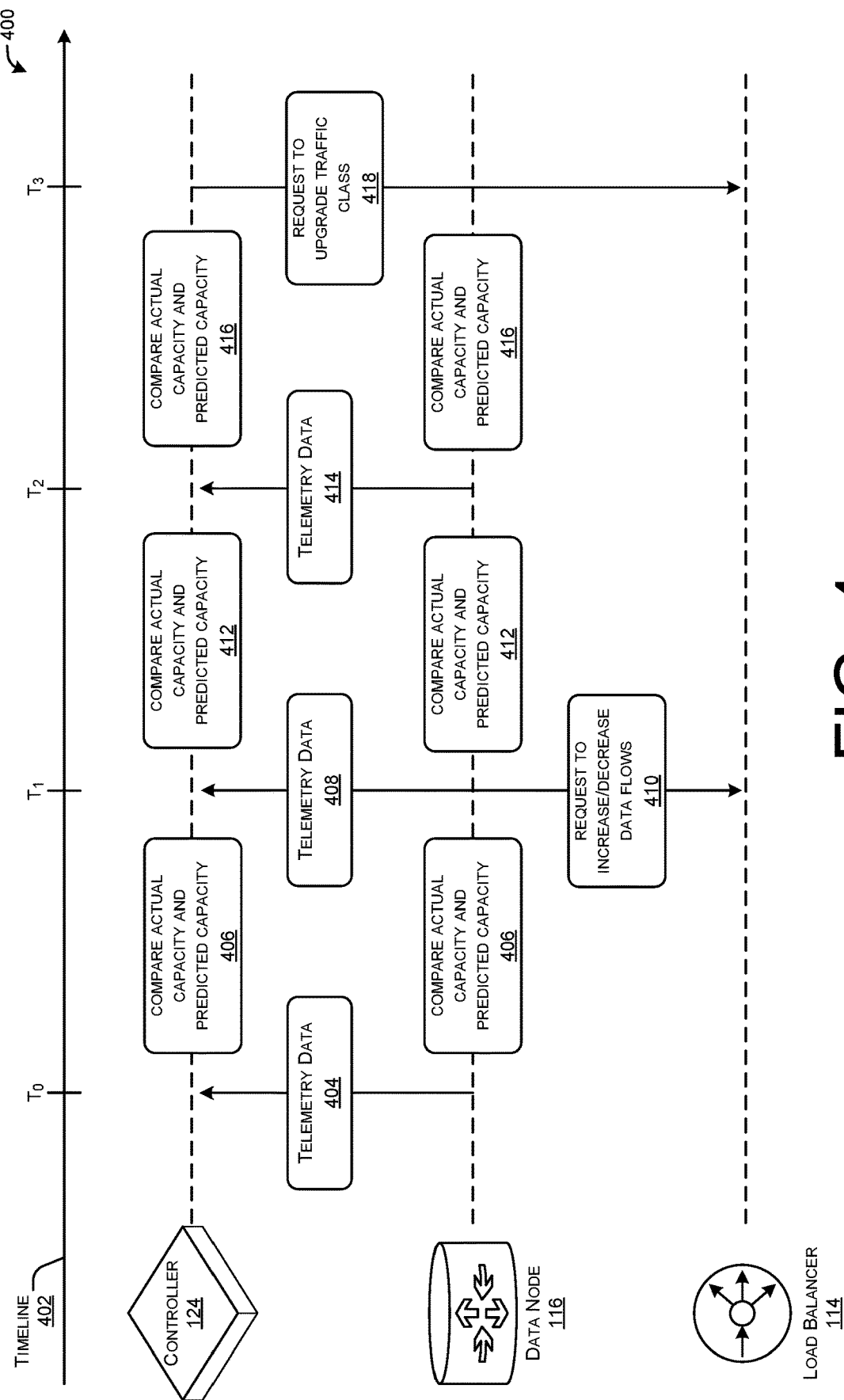

DYNAMIC LOAD ADJUSTMENT

TECHNICAL FIELD

The present disclosure relates generally to improved techniques for dynamically load balancing traffic based on predicted and actual load capacities of backend server nodes.

BACKGROUND

Cloud-delivered Secure Access Service Edge (SASE) products, such as cloud-delivered virtual private networks (VPNs), provide their service offerings in a Software-as-a-Service (SaaS) model. This allows them to scale in unique ways. Since they are distributed systems, they are typically scaled horizontally. Load-balancing of incoming flows is required to scale these system horizontally. Load balancing allows service operators the ability to direct flows to appropriate backend server nodes. Further, load balancing allows the operators to provide services such as reserved instances based on customer classes, for example.

However, in an environment where load balancers direct traffic to a pool of server nodes, the load balancing criteria may not be sufficient to ensure that the server nodes will remain fully utilized throughout their lifetime, especially when traffic levels are inconsistent. As load balancers aim at minimizing the delay introduced in the traffic they handle, load balancing algorithms often trade some level of accuracy for performance. Additionally, providing automatic upgrading of backend processes is a difficult task, and using Equal Cost Multipath (ECMP) routing to spread VPN traffic from a data center edge router to a pool of backend nodes does not allow for any sort of "pinning" behavior, nor does it allow for automatically adjusting the pinning values.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 4 illustrates a data flow diagram of an example traffic flow between a load balancer, a data node, and a controller to perform some of the techniques described herein for dynamic load adjustment and dynamic traffic class upgrading.

DESCRIPTION OF EXAMPLE EMBODIMENTS

Overview

Figure 1:
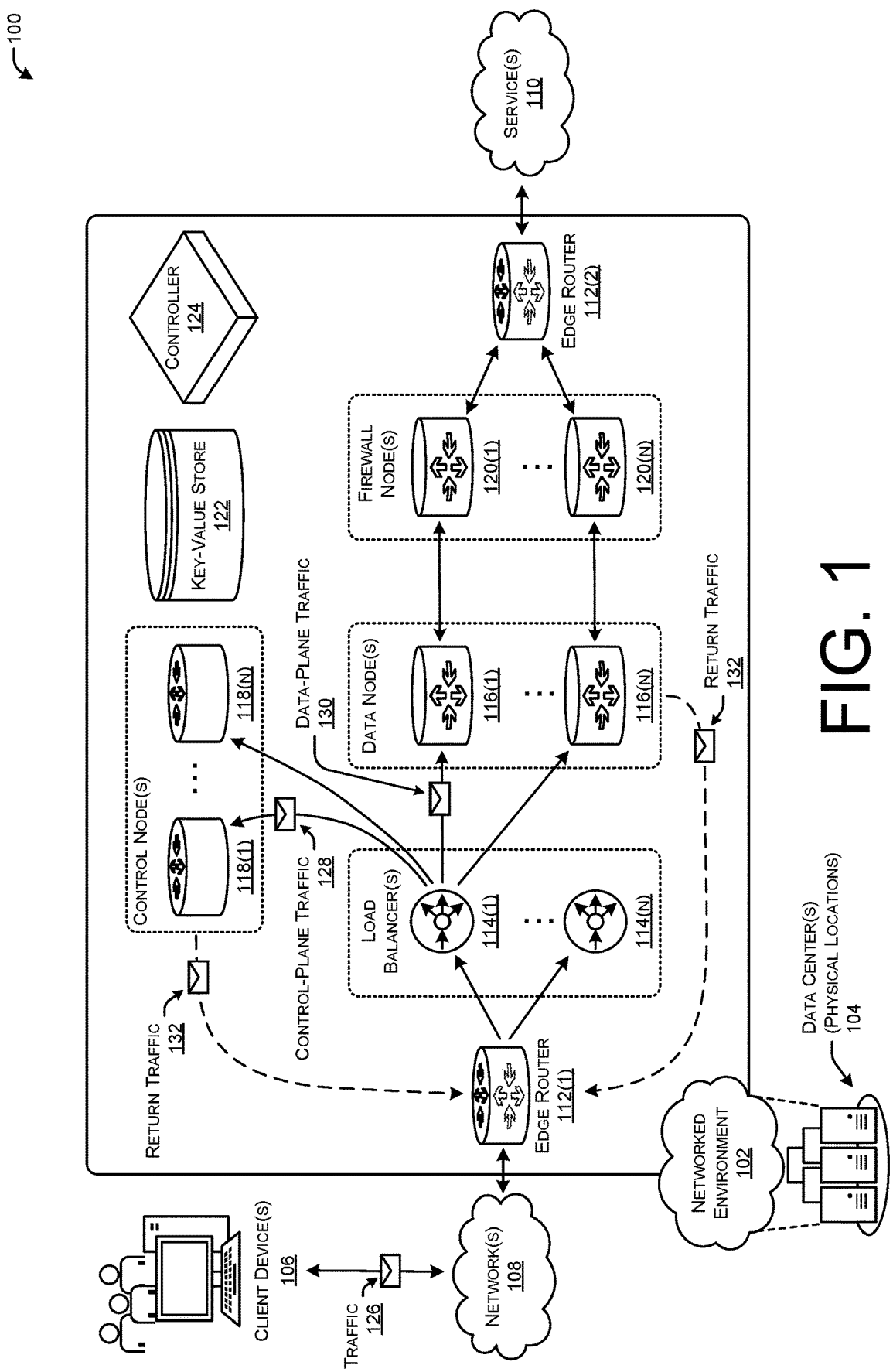
FIG. 1 illustrates a schematic view of an example system-architecture of a networked environment including a tunneled communication session comprising split control plane and data plane traffic flows.

This disclosure describes systems and methods that, among other things, improve technologies related to dynamically load balancing traffic based on predicted and actual load capacities of backend server nodes. By way of example, and not limitation, a method according to the various techniques described in this disclosure may include determining, by a first data node of a network, a predicted capacity of the first data node during a period of time. The method may also include sending, to a load balancer of the network, an indication of the predicted capacity to prompt the load balancer to send a first number of data flows to the first data node during the period of time. The method may further include determining, by the first data node and during the period of time, a difference between the predicted capacity of the first data node and an actual capacity of the first data node. Based at least in part on the difference, the method may include prompting the load balancer to send a second number of the data flows to the first data node during the period of time.

In additional or alternative examples, the first data node may be associated with a first traffic class, and the method may include determining, by a controller of the network, the predicted capacity of the first data node during the period of time. Additionally, the controller may receive, during the period of time, telemetry data indicating the actual capacity of the first data node during the period of time. The method may also include determining, by the controller, that the difference between the actual capacity of the first data node and the predicted capacity of the first data node is greater than a threshold difference. Based at least in part on the difference being greater than the threshold difference, the controller may send, to the load balancer, a request to redirect a data flow associated with a second traffic class to the first data node during the period of time such that the data flow is handled according to the first traffic class.

Additionally, the techniques described herein may be performed as a method and/or by a system having non-transitory computer-readable media storing computer-executable instructions that, when executed by one or more processors, performs the techniques described herein.

Example Embodiments

As discussed above, in an environment where load balancers direct traffic to a pool of server nodes, the load balancing criteria may not be sufficient to ensure that the server nodes will remain fully utilized throughout their lifetime, especially when traffic levels are inconsistent. As load balancers aim at minimizing the delay introduced in the traffic they handle, load balancing algorithms often trade some level of accuracy for performance. These server nodes, however, may have information about their nominal capacity (e.g., number of hardware/software interruptions, I/O, etc.), current utilization (e.g., memory, CPU, I/O, etc.), as well as their utilization history. This makes these nodes able to more accurately determine their real load state and available capacity, and even accommodate some level of overcommitment based on usage fluctuations, trends, and observed traffic patterns (e.g., by time-of-day, frequency, or other criteria). Additionally providing automatic upgrading of backend processes is a difficult task, and using Equal Cost Multipath (ECMP) routing to spread VPN traffic from a data center edge router to a pool of backend nodes does not allow for any sort of "pinning" behavior, nor does it allow for automatically adjusting the pinning values.

Accordingly, one aspect of this disclosure is directed to techniques for these backend server nodes to complement load balancer decisions by claiming more traffic or warning about imminent congestion, thus emulating a "feedback control loop" to allow for dynamic load balancing by using more metrics than the load balancing algorithm is capable of handling. Take, for example, a load balancing algorithm that defines allocations based on harmonized number of tunnels allocated to each backend server node. As the traffic pattern or trend changes, the backend node may either let the load balancers know of an imminent congestion based on changes in the traffic pattern, trends, and/or usage history, as well as let the load balancers know that the server node's deeper analysis concludes that it can handle more traffic than the load balancer is currently sending to it. For instance, the backend server nodes may send an indication (e.g., an Explicit Congestion Notification (ECN) or the like) to complement the load balancers. In some examples, the feedback control loop may be defined with the desired Set Point (SP) as the estimated capacity, the current load as the Process Variable (PV), and the error as the difference between both, and based on the magnitude of the error, an appropriate control algorithm can be picked to gradually apply corrections (increase or decrease load), based on Proportional (P), Proportional Integral (PI), or Proportional Integral Derivative (PID) terms.

Additionally, another aspect of this disclosure is directed to measuring and determining historical usage of a certain data flow and upgrading it to a better traffic class if resources are available (e.g., throughput). For example, a data flow (e.g., encrypted tunnel) may suddenly experience a rush of incoming traffic at a sustained rate. In order to control the CPU usage of a backend server node, the techniques described herein may dynamically detect this usage and place the data flow on a specific backend server node, while at the same time preventing additional data flows from using that node. For instance, a moving average technique may be used to adjust the pinning of a data flow to a specific backend server node, reserving the backend node for a high-throughput customer, and moving lower-throughput data flows to the remainder of the other backend nodes. In some instances, bandwidth and traffic usage may be determined and/or used to adjust the mappings on a load balancer. Additionally, net stats per-5-tuple may be used as well, allowing for the backend server nodes and/or a network controller to, among other things: guess how much load a client may consume based on historic usage data; auto-upgrade a data flow if a backend server node has spare resources; in the case of IPsec, detect whether decrypted child_sa traffic is sensitive to jitter/delay (e.g., multimedia) and handle that child_sa separately on a more powerful backend server node; allow a data flow to temporarily exceed its contractual flow rate to absorb spikes, and the like.

Thus, according to the various techniques described in this disclosure, improvements in computer-related technology may be realized. As discussed above, the techniques of this disclosure provide functionality for a backend server node to either let load balancers know of an imminent congestion based on changes in the traffic pattern, trends, and/or usage history, as well as let the load balancers know that the backend server node's deeper analysis concludes that it can handle more traffic than the load balancer is currently sending to it. This improves the functioning of load balancers and/or backend server nodes by more efficiently allocating data flows to specific backend server nodes that have available resources to handle the data flows. Additionally, in some instances a specific data flow that is associated with a first traffic class may be upgraded to a second, higher traffic class if a backend server node has available resources, thus providing a better experience for users. These are just some examples of the multiple improvements that may be realized according to the techniques described in this disclosure. These and other improvements will be easily understood and appreciated by those having ordinary skill in the art.

By way of example, and not limitation, a method according to the various techniques described by this disclosure may include determining, by a data node (e.g., backend server node, worker node, etc.) of a network, a predicted (e.g., estimated) capacity of the data node during a period of time. In various examples, the data node may be one of multiple data nodes of the network that are configured to process data plane traffic (e.g., encapsulating security payload (ESP) packets associated with an IPsec connection, packets associated with a Wireguard connection, packets associated with a TLS/DTLS connection, etc.) or any form of encrypted payload. As such, in some examples the network may also include, in addition to the multiple data nodes, multiple control nodes that are configured to process control plane traffic (e.g., internet key exchange (IKE) packets associated with the IPsec connection, packets of an SSL VPN control protocol, packets of a Wireguard control protocol, etc.) or, similarly, any traffic related to protocols for establishing a secure authenticated session between a number of VPN peers, through which peers can exchange session lifecycle events.

In some examples, the predicted capacity may be indicative of a number of available or unavailable computing resources of the data node. For instance, the computing resources may include, among other things, memory, processing units (e.g., CPU, GPU, etc.), throughput, number of hardware or software interruptions, I/O, and/or the like. In some examples, the predicted capacity of the data node may be determined based at least in part on utilization history associated with the data node. Additionally, or alternatively, the predicted capacity of the data node may be determined based at least in part on present behavior of the data node. For instance, if the data node determines that it has capacity to receive additional data flows or, conversely, that it is over capacity and needs to reduce the number of data flows being sent to it, then the data node may send an indication to a load balancer to either increase or decrease the number of data flows being sent to it. As such, the data node may determine its predicted capacity during the period of time based on sending the indication to either increase or decrease the number of flows. In some examples, usage statistics and/or utilization history associated with a data node may be stored in a remote database. In this way, if a data node failure occurs, a new data node may recover previous usage statistics and/or utilization data for the flows of the failed data node.

In some examples, the period of time during which the predicted capacity is determined may be a present period of time, a future period of time, a future instance of time, etc. By way of example, and not limitation, the period of time may be an interval of time from, for instance, 4:00 AM to 6:00 AM, 6:00 PM to 8:00 PM, or the like. Additionally, or alternatively, the period of time may be an instance of time occurring at 4:00 PM, 5:00 PM, 6:00 PM, or the like. In even further examples, the period of time may be associated with particular days of the week and/or days of the year (e.g., weekday (Monday, Tuesday, Friday, etc.), weekend (e.g., Saturday or Sunday), Easter, Independence Day, Thanksgiving, Christmas, etc.). As an example, a period of time during which a predicted capacity may be determined may be from 5:00 PM on a Friday to 8:00 AM on a Monday, or the like.

In some examples, the method may further include sending, to a load balancer of the network, an indication of the predicted capacity to prompt the load balancer to send a first number of data flows to the data node during the period of time. The first number of data flows may be a predicted number of data flows that, if all sent to the data node during the period of time, would cause the data node to operate at or near full capacity. In some examples, the load balancer may send data flows to the multiple data nodes according to an equal cost multipath (ECMP) routing strategy.

In various examples, the method also may include determining, by the data node and during the period of time, a difference between the predicted capacity of the data node and an actual capacity of the data node. Accordingly, based at least in part on the difference, the data node may prompt the load balancer to send a second number of the data flows to the data node during the period of time. In some examples, the second number of the data flows may be greater than the first number of the data flows. Alternatively, the second number of the data flows may be less than the first number of the data flows. In some examples, prompting the load balancer to send the second number of the data flows may be based at least in part on determining that the difference is greater than a threshold difference. In some examples, the actual capacity may be indicative of a current number of available or unavailable computing resources of the data node during the present period of time. The computing resources may include, among other things, memory, processing units (e.g., CPU, GPU, etc.), throughput, number of hardware or software interruptions, I/O, and/or the like.

In at least one example, the data node may determine, during a second period of time that is subsequent to the first period of time, a second difference between the actual capacity of the data node and the second number of the data flows. Based at least in part on the second difference, the data node may prompt the load balancer to send a third number of the data flows to the data node during the second period of time. In some instances, the second number of the data flows may be either one of greater than the first number or less than the first number. Additionally, the third number of the data flows may be either one of greater than the second number or less than the second number. In other words, the third number of the data flows may be determined in order to push the data node closer to its ideal operating capacity, and that may include either one of increasing or decreasing the total number of data flows being sent to the data node, based on the current capacity.

The above described method may, in at least some examples, additionally or alternatively include operations for dynamically upgrading a data flow from a first traffic class to a second traffic class. For instance, the data node of the above example may comprise a first data node of the network that is associated with a first traffic class. Additionally, the predicted capacity of the first data node may be determined by a controller of the network. In some examples, the traffic class may be associated with a specific quality of service (QoS) metric or a specific traffic profile (e.g., audio traffic, video traffic, web traffic, streaming, etc.).

In some examples, the method may also include receiving, at the controller and during the period of time, telemetry data indicating the actual capacity of the first data node during the period of time. That is, the telemetry data may be indicative of a number of available or unavailable computing resources of the first data node. In some examples, the controller may determine that a difference between the actual capacity of the first data node and the predicted capacity of the first data node is greater than a threshold difference (e.g., that the first data node has more than a threshold amount of available computing resources).

Based at least in part on the difference being greater than the threshold difference, in some examples the controller may send, to the load balancer, a request to redirect one or more specific data flow(s) associated with a second traffic class to the first data node during the period of time so that the data flow(s) can be handled according to the first traffic class. For instance, the one or more specific data flow(s) may be hosted by one or more second data node(s) prior to being redirected, and the one or more second data node(s) may be associated with the second traffic class. In some examples, the second traffic class may be lower than the first traffic class. In at least one examples, the controller may determine to redirect the one or more specific data flow(s) based at least in part on a current capacity of the one or more second data node(s) during the period of time being greater than an estimated capacity. In other words, the controller may determine to redirect the data flow(s) based on the second data node(s) operating above their optimal capacity.

In some examples, during a second period of time subsequent to the period of time in which the one or more specific data flow(s) were redirected, the controller may send a second request to the load balancer to redirect some or all of the one or more specific data flow(s) to at least one of the second data node(s) or a third data node that is associated with the second traffic class. For instance, data flows that are associated with the first traffic class that are to be sent to the first data node may need additional computing resources, and the first data node may no longer have additional computing resources available to allocate to the one or more specific data flow(s) associated with the lower traffic class. As such, the one or more specific data flow(s) may need to be sent back to data nodes that are associated with the second traffic class.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a schematic view of an example system-architecture 100 of a networked environment 102 including a tunneled communication session comprising split control-plane and data-plane traffic flows. Generally, the networked environment 102 may include devices that are housed or located in one or more data centers 104 that may be located at different physical locations. For instance, the networked environment 102 may be supported by networks of devices in a public cloud computing platform, a private/enterprise computing platform, and/or any combination thereof. The one or more data centers 104 may be physical facilities or buildings located across geographic areas that are designated to store networked devices that are part of the networked environment 102. The data centers 104 may include various networking devices, as well as redundant or backup components and infrastructure for power supply, data communications connections, environmental controls, and various security devices. In some examples, the data centers 104 may include one or more virtual data centers which are a pool or collection of cloud infrastructure resources specifically designed for enterprise needs, and/or for cloud-based service provider needs. Generally, the data centers 104 (physical and/or virtual) may provide basic resources such as processor (CPU), memory (RAM), storage (disk), and networking (bandwidth). However, in some examples the devices in the networked environment 102 may not be located in explicitly defined data centers 104 and, rather, may be located in other locations or buildings.

The networked environment 102 may be accessible to client devices 106 over one or more networks 108. The networked environment 102, and the networks 108, may each respectively include one or more networks implemented by any viable communication technology, such as wired and/or wireless modalities and/or technologies. The networked environment 102 and networks 108 may each may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.), Virtual Private Networks (VPNs), Wide Area Networks (WANs) — both centralized and/or distributed — and/or any combination, permutation, and/or aggregation thereof. The networked environment 102 may include devices, virtual resources, or other nodes that relay packets from one network segment to another by nodes in the computer network.

In some examples, the networked environment 102 may provide, host, provide connectivity to, or otherwise support one or more services 110 for client devices 106 to connect to and use. The client devices 106 may comprise any type of device configured to communicate using various communication protocols (e.g., VPN, SSL, TLS, DTLS, and/or any other protocol) over the networks 108. For instance, the client device 106 may comprise a personal user device (e.g., desktop computers, laptop computers, phones, tablets, wearable devices, entertainment devices such as televisions, etc.), network devices (e.g., servers, routers, switches, access points, etc.), and/or any other type of computing device.

In some examples, the networked environment 102 may include edge routers 112(1) and 112(2) (hereinafter referred to collectively as "edge routers 112"), load balancers 114(1)-114(N) (hereinafter referred to collectively as "load balancers 114") (where N represents any number greater than or equal to one), data nodes 116(1)-116(N), control nodes 118(1)-118(N), firewall nodes 120(1)-120(N), a key-value store 122, and a controller 124. In some examples, the edge routers 112 and the load balancers 114 may use ECMP, which is a strategy where next-hop packet forwarding to a single destination can occur over multiple "best paths" which tie for top place in routing metric calculations. Further, any routing strategy may be used by the edge routers 112 and the load balancers 114, such as Open Shortest Path First (OSPF), Intermediate System to Intermediate System (ISIS), Enhanced Interior Gateway Routing Protocol (EIGRP), and/or Border Gateway Protocol (BGP) in conjunction with ECMP routing. Although shown in FIG. 1 as separate entities, it is to be appreciated that in some instances the edge routers 112 and the load balancers 114 may reside on a same hardware device and/or node.

The edge routers 112 may, in some instances, balance traffic 126 based on a hash of a network 5-tuple in order to route packets to the load balancers 114. The traffic 126 may include both control-plane traffic 128 and data-plane traffic 130. Additionally, the load balancers 114 may balance traffic 126 based on a hash of a network 6-tuple in order to route control-plane traffic 128 to the control nodes 118 and to route data-plane traffic 130 to the data nodes 116. The network 6-tuple of a packet may include a packet's SPI value, source IP address, source port, destination IP address, destination port, and protocol.

As shown, the networked environment 102 may include data nodes 116(1)-116(N) (hereinafter referred to collectively as "data nodes 116") (where N represents any number greater than or equal to one). In some examples, the data nodes 116 may process data-plane traffic 130 on behalf of the networked environment 102. The data-plane traffic 130 may comprise ESP traffic associated with an IPsec connection. In some examples a data node 116(1) of the data nodes 116 may be associated with one or more IPsec security associations. Additionally, the data nodes 116 may forward data plane traffic 130 to one or more downstream nodes and/or devices, such as the firewall nodes 120(1)-120(N) (hereinafter referred to collectively as "firewall nodes 120") (where N represents any number greater than or equal to one). In some examples, a first data node of the data nodes 116 may be associated with a first traffic class, a second data node of the data nodes 116 may be associated with a second traffic class, and so forth. Additionally, or alternatively, a first interface of a first data node of the data nodes 116 may be associated with a first traffic class, a second interface of the first data node of the data nodes 116 may be associated with a second traffic class, and so forth.

In some examples, the data nodes 116 may determine their predicted capacities during various periods of time and send indications of their predicted capacities to the load balancers 114 so that the load balancers 114 may adjust (e.g., increase or decrease) a number of data flows of the data-plane traffic 130 that the load balancer 114 are sending to respective data nodes 116. The data nodes 116 may perform these techniques as part of a feedback control loop to ensure that the computing resources of each of the data nodes 116 are being used to their maximum potential or capacity. In some examples, the choice of algorithm used for the feedback control loop may determine how efficiently or smoothly a data node reaches its maximum potential or capacity.

The networked environment 102 may also include one or more control nodes 118(1)-118(N) (hereinafter referred to collectively as "control nodes 118") (where N represents any number greater than or equal to one). In some examples, the control nodes 118 may process control-plane traffic 128 on behalf of the networked environment 102. The control-plane traffic 128 may comprise IKE traffic associated with an IPsec connection.

As shown, both the data nodes 116 and the control nodes 118 may perform direct server return (DSR) to send return traffic 132 back to the client devices 106. That is, the data nodes 116 and the control nodes 118 may send return traffic 132 to the client devices 106 via the edge router 112(1), bypassing the load balancers 114. Additionally, or alternatively, the data nodes 116 and the control nodes 118 may send the return traffic 132 directly to the client devices, bypassing the edge router 112(1).

The networked environment 102 may also include a key-value store 122 and a controller 124. The key-value store 122 may include one or more databases that are accessible to the various nodes and devices of the networked environment 102. In some examples, the load balancers 114, the data nodes 116, the control nodes 118, and other nodes and/or devices of the networked environment 102 may read data from and/or write data to the key-value store 122. The key-value store 122 may store associations between SPI values and SAs, SPI values and sets of 5-tuple values, and the like. In some examples, the controller 124 may receive telemetry data from the data nodes 116 and/or the control nodes 118 and, based at least in part on the telemetry data, determine statuses associated with individual ones of the data nodes 116 and/or the control nodes 118. For instance, the controller 124 may receive telemetry data indicating a load capacity associated with the data node 116(1). The controller 124 may also determine if the load capacity meets or exceeds a threshold load capacity and, if so, the controller 124 may prompt the data node 116(1) to send a notification to the load balancer 114(1) to request that the load balancer 114(1) adjust where it is sending the data-plane traffic 130. For instance, the controller 124 may send an indication to the load balancer 114(1) to upgrade one or more data flows of the data-plane traffic 130 from a first traffic class to a second traffic class by, for instance, sending the data flows to the data node 116(N) rather than the data node 116(1).

Although depicted in FIG. 1 as separate hardware components, it should be understood that the edge routers 112, the load balancers 114, the data nodes 116, the control nodes 118, the firewall nodes 120, the key-value store 122, and/or the controller 124 may be software components at least partially residing in memory. In this way, one or more processors may execute instructions that cause the one or more processors to perform all of the operations described herein with respect to the edge routers 112, the load balancers 114, the data nodes 116, the control nodes 118, the firewall nodes 120, the key-value store 122, and/or the controller 124. In some instances, edge routers 112, the load balancers 114, the data nodes 116, the control nodes 118, the firewall nodes 120, the key-value store 122, and/or the controller 124 may be individual hardware components and/or software components that reside in a standalone device or a system of standalone devices. Additionally, or alternatively, the edge routers 112, the load balancers 114, the data nodes 116, the control nodes 118, the firewall nodes 120, the key-value store 122, and/or the controller 124 may include any type of networking device, such as servers, switches, routers, hubs, bridges, gateways, modems, repeaters, access points, etc.

Figure 2A:
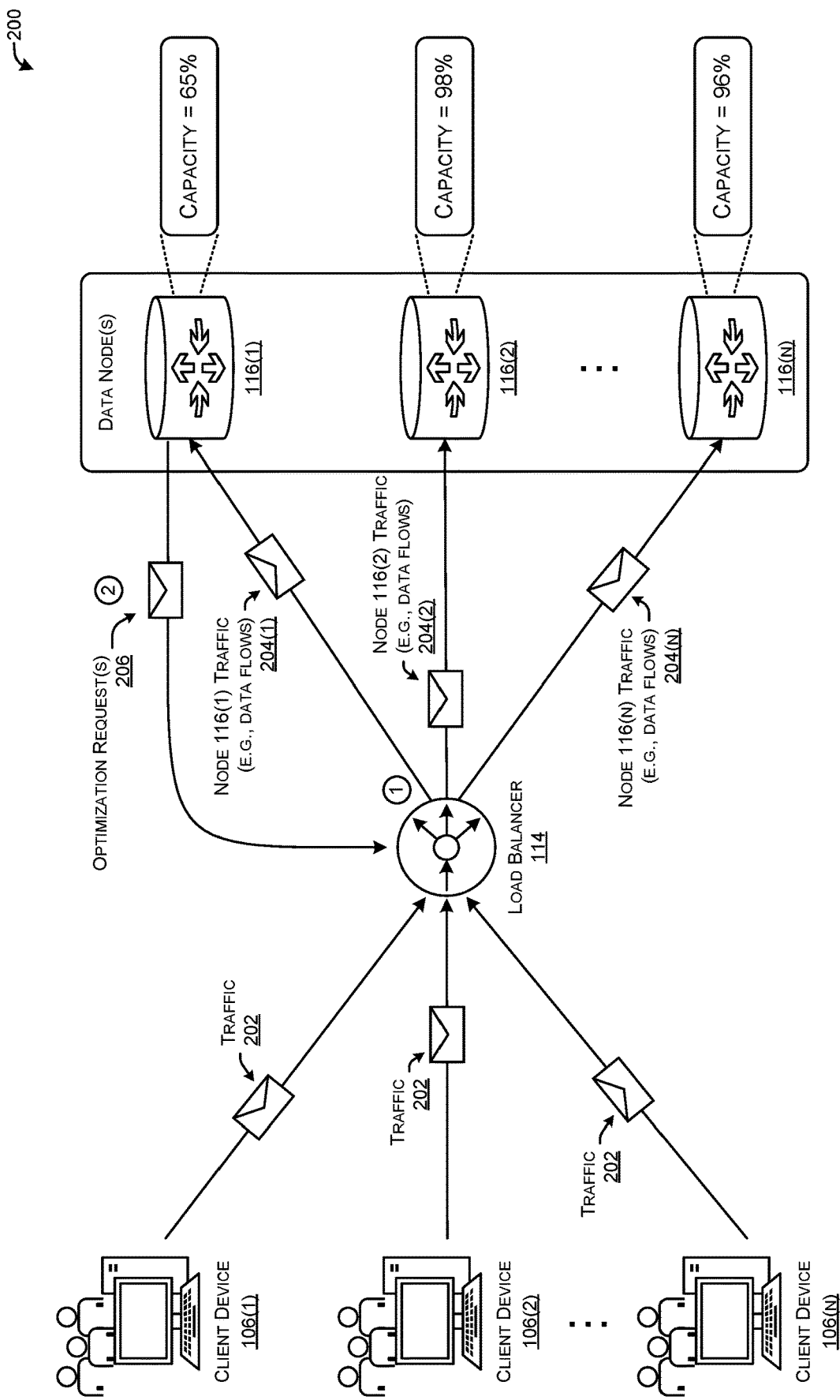
FIGS. 2A and 2B collectively illustrate a schematic view of an example traffic flow in which a data node sends, to a load balancer, a request for the load balancer to increase the number of data flows being sent to the data node.
Figure 2B:
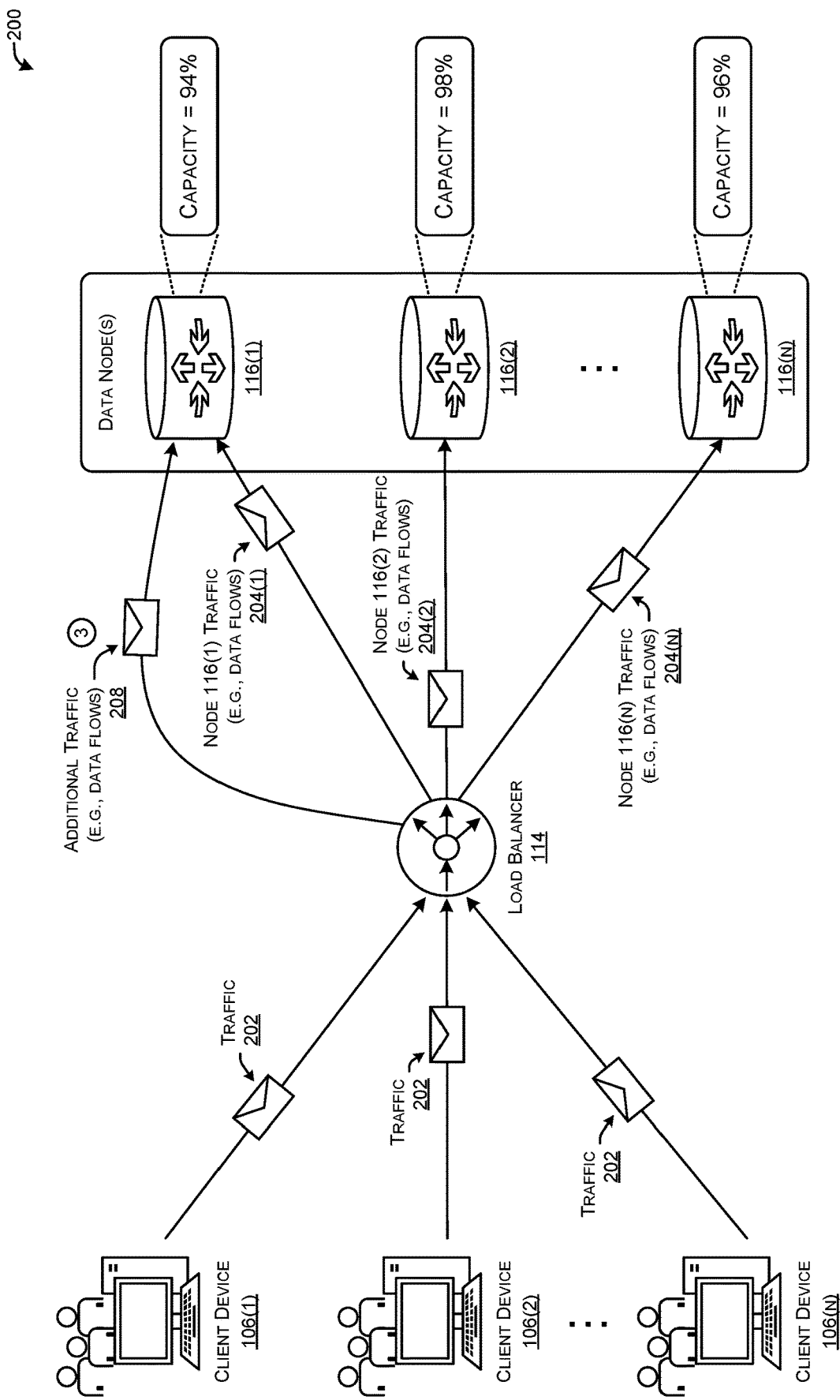

FIGS. 2A and 2B collectively illustrate a schematic view of an example traffic flow 200 in which a data node 116(1) sends, to a load balancer 114, a request for the load balancer 114 to increase the number of data flows being sent to the data node 116(1).

At "1," the client devices 106(1), 106(2), and 106(N) (hereinafter referred to collectively as "client devices 106") (where N represents any number greater than or equal to one) may send traffic 202 (e.g., control plane and data plane traffic) to the load balancer 114, and the load balancer 114 may forward the traffic 204 (e.g., data plane traffic) to the respective data nodes 116 according to, for instance, an ECMP routing strategy based on a network 5-tuple. For instance, the load balancer 114 may send node 116(1) traffic 204(1) (e.g., data flows) to the data node 116(1), node 116(2) traffic 204(2) to the data node 116(2), and node 116(N) traffic 204(N) to the data node 116(N). As shown in FIG. 2A, each of the data nodes 116 may be operating at a different capacity based at least in part on a number of data flows currently being sent to each of the data nodes 116. For instance, data node 116(1) is shown operating at 65% capacity, data node 116(2) is shown operating at 98% capacity, and data node 116(N) is shown operating at 96% capacity.

At "2," the data node 116(1) may send one or more optimization requests 206 to the load balancer 114. The data node 116(1) may send the optimization request(s) 206 to the load balancer 114 based at least in part on the data node 116(1) operating at 65% capacity. For instance, the optimization request(s) 206 may indicate to the load balancer 114 that the data node 116(1) is operating at less than full capacity, and that the load balancer 114 may send additional data flows to the data node 116(1). Although shown in FIGS. 2A and 2B as a request to increase the number of data flows sent to the data node 116(1), the optimization request(s) 206 may also be used to indicate that a data node is operating above full capacity and that the load balancer 114 should redirect one or more data flows away from that data node.

At "3," the load balancer 114(1) may send additional traffic 208 (e.g., additional data flows) to the data node 116(1) to increase the capacity of the data node 116(1). For instance, the capacity of the data node 116(1) is increased to 94% based on receiving the additional traffic 208 shown in FIG. 2B. The load balancer 114(1) may send the additional traffic 208 to the data node 116(1) based at least in part on receiving the optimization request 206 from the data node 116(1) as part of a feedback control loop.

Figure 3A:
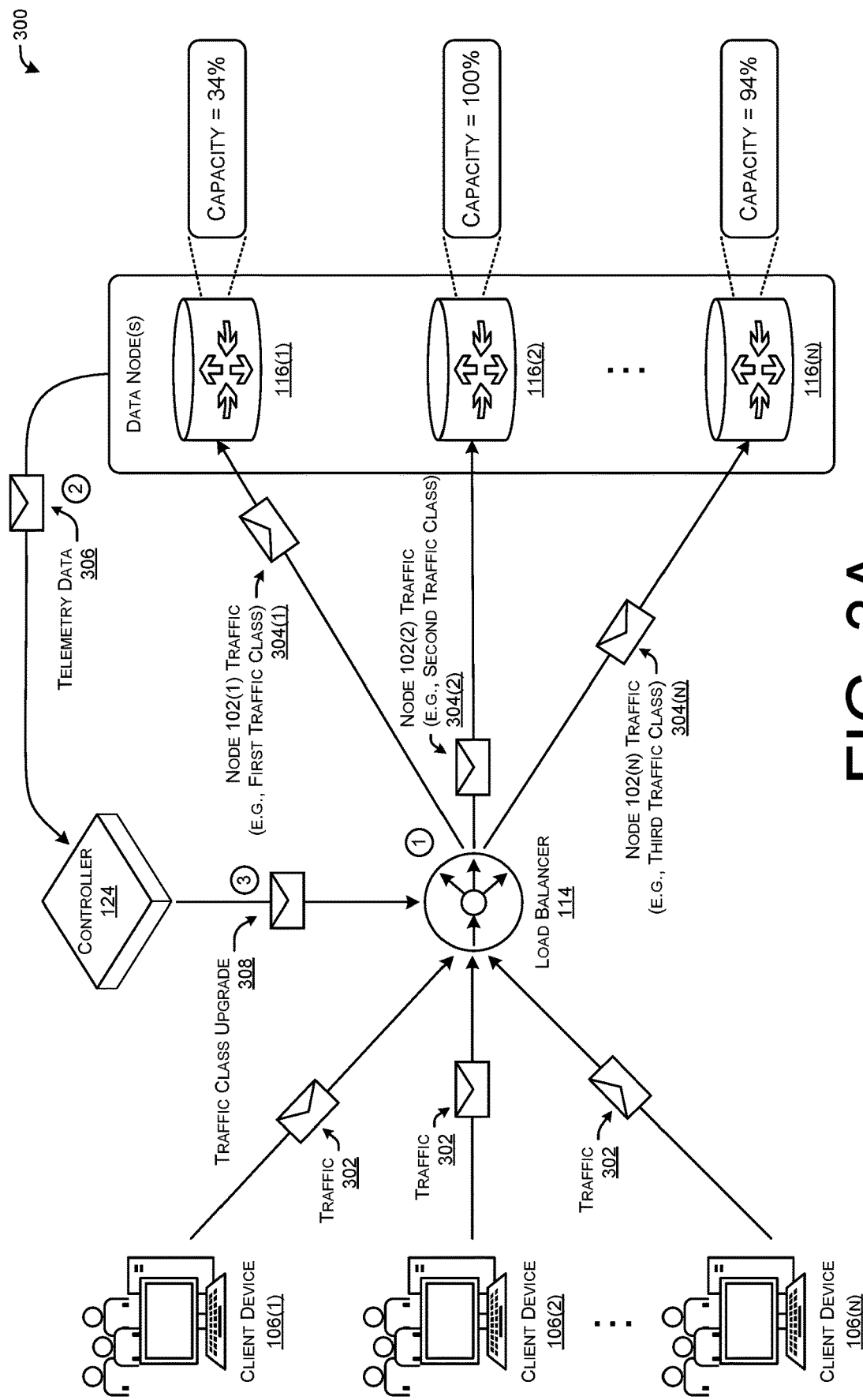
FIGS. 3A and 3B collectively illustrate a schematic view of an example traffic flow in which one or more data node(s) send telemetry data to a controller, and the controller uses the telemetry data to determine to upgrade one or more data flows from a first traffic class to a second traffic class.
Figure 3B:
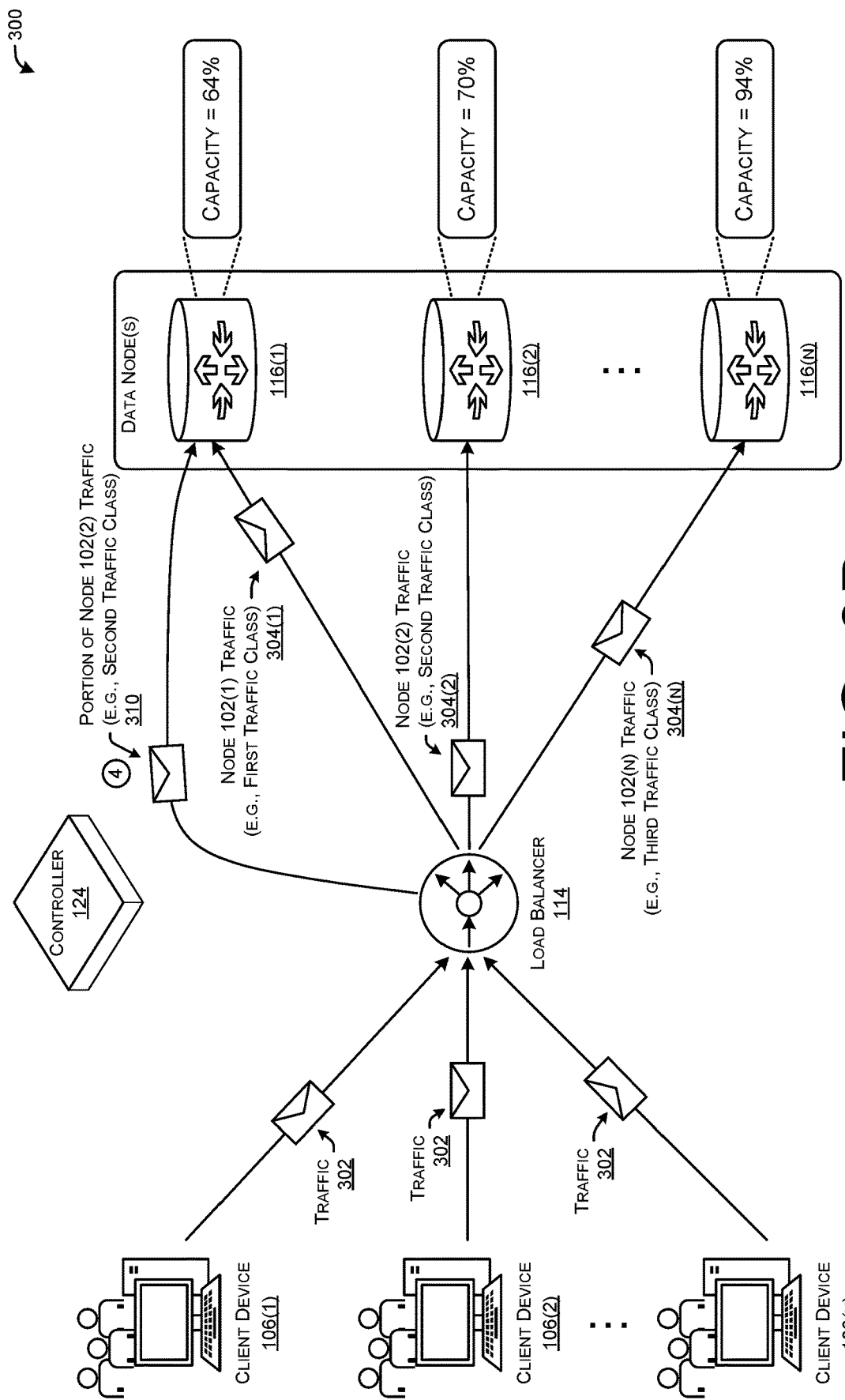

FIGS. 3A and 3B collectively illustrate a schematic view of an example traffic flow 300 in which one or more data node(s) 116 send telemetry data 306 to a controller 124, and the controller 124 uses the telemetry data 306 to determine to upgrade one or more data flows from a first traffic class to a second traffic class.

At "1," the client devices 106 may send traffic 302 (e.g., data plane and control plane traffic) to the load balancer 114, and the load balancer 114 may forward the traffic 304 (e.g., data plane traffic) to the respective data nodes 116 according to, for instance, an ECMP routing strategy based on a network 5-tuple. For instance, the load balancer 114 may send node 116(1) traffic 304(1) (e.g., data flows of a first traffic class) to the data node 116(1), node 116(2) traffic 304(2) (e.g., data flows of a second traffic class) to the data node 116(2), and node 116(N) traffic 304(N) (e.g., data flows of a third traffic class) to the data node 116(N). As shown in FIG. 3A, each of the data nodes 116 may be operating at a different capacity based at least in part on a number of data flows currently being sent to each of the data nodes 116. For instance, data node 116(1) is shown operating at 34% capacity, data node 116(2) is shown operating at 100% capacity, and data node 116(N) is shown operating at 94% capacity.

At "2," the data nodes 116 may send telemetry data 306 to the controller 124. The telemetry data 306 may be indicative of the load capacities of the data nodes 116. For instance, the controller 124 may receive first telemetry data 306 from the data node 116(1) indicating that the current load capacity of the data node 116(1) is 34%, second telemetry data 306 from the data node 116(2) indicating that the current load capacity of the data node 116(2) is 100%, and so forth. In some examples, the data node 116(1) may be associated with the first traffic class, the data node 116(2) may be associated with the second traffic class, and the data node 116(N) may be associated with the third traffic class.

At "3," the controller 124 may send a traffic class upgrade indication 308 to the load balancer 114. The traffic class upgrade indication 308 may indicate that the load balancer is to redirect some of the node 102(2) traffic of the second traffic class to the data node 116(1) so that the node 102(2)

traffic may be handled according to the first traffic class. For example, based at least in part on receiving the telemetry data 306 from the data nodes 116, the controller 124 may determine that the data node 116(1), which is associated with a first traffic class, has additional capacity and/or resources to receive additional data flows. In addition, the controller 124 may determine, based at least in part on the telemetry data 306, that the data node 116(2), which is associated with a second, lower traffic class, is operating at full capacity. Based on this, the controller 124 may send the traffic class upgrade notification 308 to cause the load balancer 114 to upgrade one or more data flows, which are being sent to node 116(2) and handled according to the second traffic class, to be sent to the data node 116(1) so that the data flows may be handled according to the first traffic class.

At "4," the load balancer 114 may send a portion of the node 102(2) traffic 310 of the second traffic class to the data node 116(1) such that the portion of the node 102(2) traffic 310 may be handled according to the first traffic class. For instance, one or more data flows that are typically sent to the data node 116(2) and handled according to the second traffic class may be sent to the data node 116(1) so that the data flows may be handled according to the first, higher traffic class since the data node 116(1) has spare capacity and/or resources. Additionally, upgrading the one or more data flows may further be based at least in part on the capacity of the data node 116(2) operating at full capacity.

FIG. 4 illustrates a data flow diagram of an example traffic flow 400 between a load balancer 114, a data node 116, and a controller 124 to perform some of the techniques described herein for dynamic load adjustment and dynamic traffic class upgrading. The operations 404-418 shown in FIG. 4 may be performed at various instances or periods of time with respect to the timeline 402. However, it is to be understood that the operations 404-418 may be performed at different times, and that the times shown in FIG. 4 are merely used for illustration purposes. The timeline 402 and the times $T_0$, $T_1$, $T_2$, and $T_3$, may represent different values or units of time. For instance, the timeline 402 may be in units of milliseconds and time To may represent 0 milliseconds, time $T_1$ may represent 1 millisecond, time $T_2$ may represent 2 milliseconds, and time $T_3$ may represent 3 milliseconds. However, this is merely an example and other units of time may be used (e.g., microseconds, seconds, minutes, hours, etc.). Furthermore, the intervals between the times $T_0$, $T_1$, $T_2$, and $T_3$, may not be equal (e.g., time $T_0$ may represent 0 seconds, time $T_1$ may represent 1 second, time $T_2$ may represent 4 seconds, and time $T_3$ may represent 7 seconds, etc.).

At time $T_0$ the data node 116 may send telemetry data 404 to the controller 124. The telemetry data 404 may be indicative of an actual or current capacity of the data node 116 at time To. For instance, the telemetry data 404 may indicate a current number of available or unavailable computing resources of the data node 116 at time To. Between times $T_0$ and $T_1$, the data node 116 and/or the controller 124 may perform operation(s) 406 and compare the actual capacity of the data node 116 during the period of time from $T_0$ to $T_1$ with the predicted capacity of the data node 116 during the period of time from $T_0$ to $T_1$.

At time $T_1$, the data node 116 may send telemetry data 408 to the controller 124. The telemetry data 404 may be indicative of an actual or current capacity of the data node 116 at time $T_1$. For instance, the telemetry data 408 may indicate a current number of available or unavailable computing resources of the data node 116 at time $T_1$. Additionally, at time $T_1$ the data node 116 may also send a request 410 to the load balancer 114 to increase or decrease the number of data flows being sent to the data node 116. For instance, based on the data node 116 performing operation 406, the data node 116 may determine that its actual capacity during the period of time from $T_0$ to $T_1$ is greater than or less than the predicted capacity of the data node 116 during the period of time from $T_0$ to $T_1$. As such, the data node 116 may send the request 410 to the load balancer 114 to increase or decrease the number of data flows being sent to the data node 116 based at least in part on comparing the actual capacity and the predicted capacity. In response to receiving the request 410, the load balancer 114 may increase or decrease the number of data flows being sent to the data node 116 during the period of time from $T_1$ to $T_2$.

Between times $T_1$ and $T_2$, the data node 116 and/or the controller 124 may perform operation(s) 412 and compare the actual capacity of the data node 116 during the period of time from $T_1$ to $T_2$ with the predicted capacity of the data node 116 during the period of time from $T_1$ to $T_2$. At time $T_2$, the data node 116 may send telemetry data 414 to the controller 124. The telemetry data 414 may be indicative of an actual or current capacity of the data node 116 at time $T_2$. For instance, the telemetry data 414 may indicate a current number of available or unavailable computing resources of the data node 116 at time $T_2$.

Between times $T_2$ and $T_3$, the data node 116 and/or the controller 124 may perform operation(s) 416 and compare the actual capacity of the data node 116 during the period of time from $T_2$ to $T_3$ with the predicted capacity of the data node 116 during the period of time from $T_2$ to T3. Based on the controller 124 performing operation 416, the controller 124 may determine that the data node 116 has additional capacity. As such, the controller 124 may send the request 418 to the load balancer 114 to upgrade a traffic class of a data flow by sending the data flow to the data node 116. For instance, the data node 116 may be associated with a higher traffic class than a current data node where the data flow is being sent. In response to receiving the request 418, the load balancer 114 may redirect a data flow of a lower traffic class to be sent to the data node 116 such that the data flow may be handled according to the higher traffic class of the data node 116 during a period of time after $T_3$.

Figure 5:
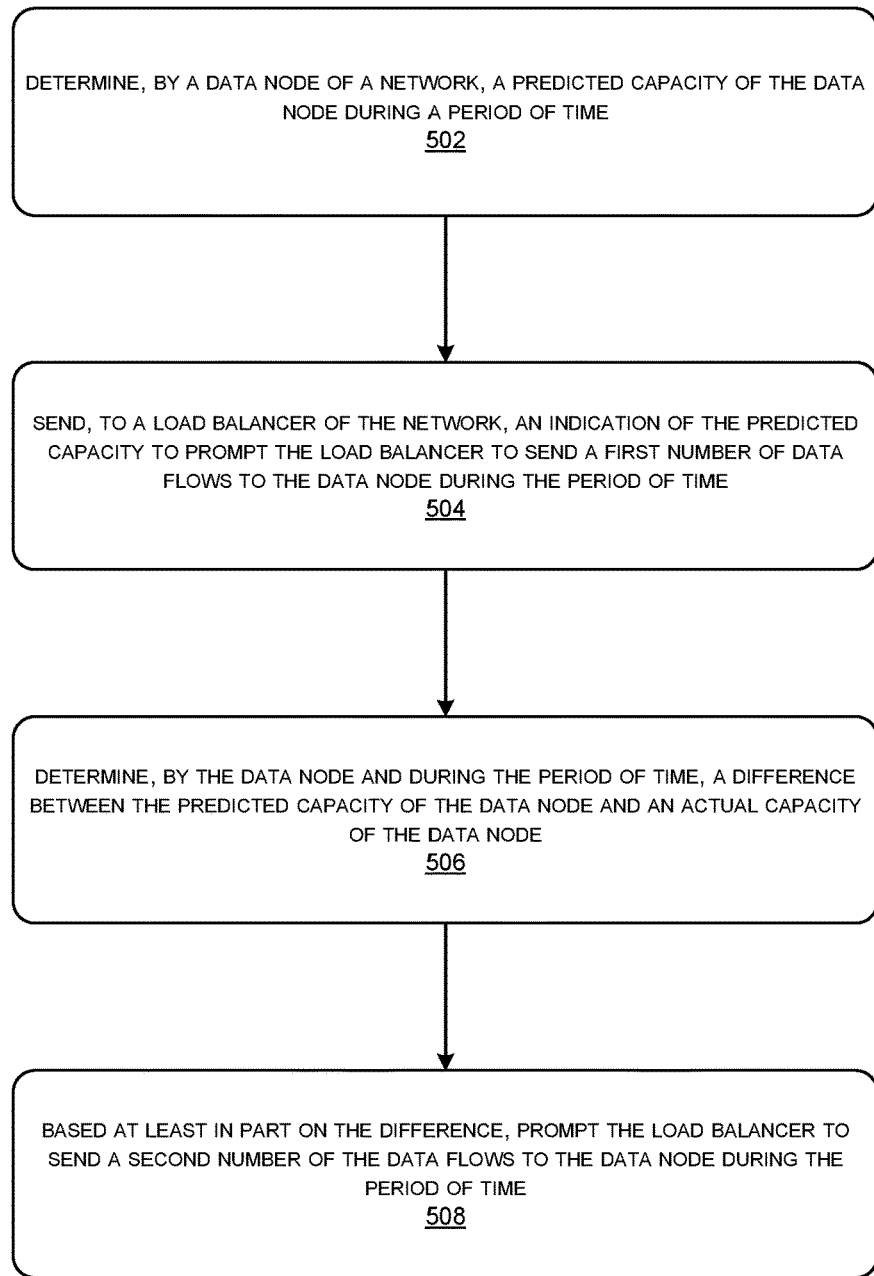
FIG. 5 illustrates a logic flow diagram of an example method for dynamic load adjustment that may be performed at least partially by a data node of a network.
Figure 6:
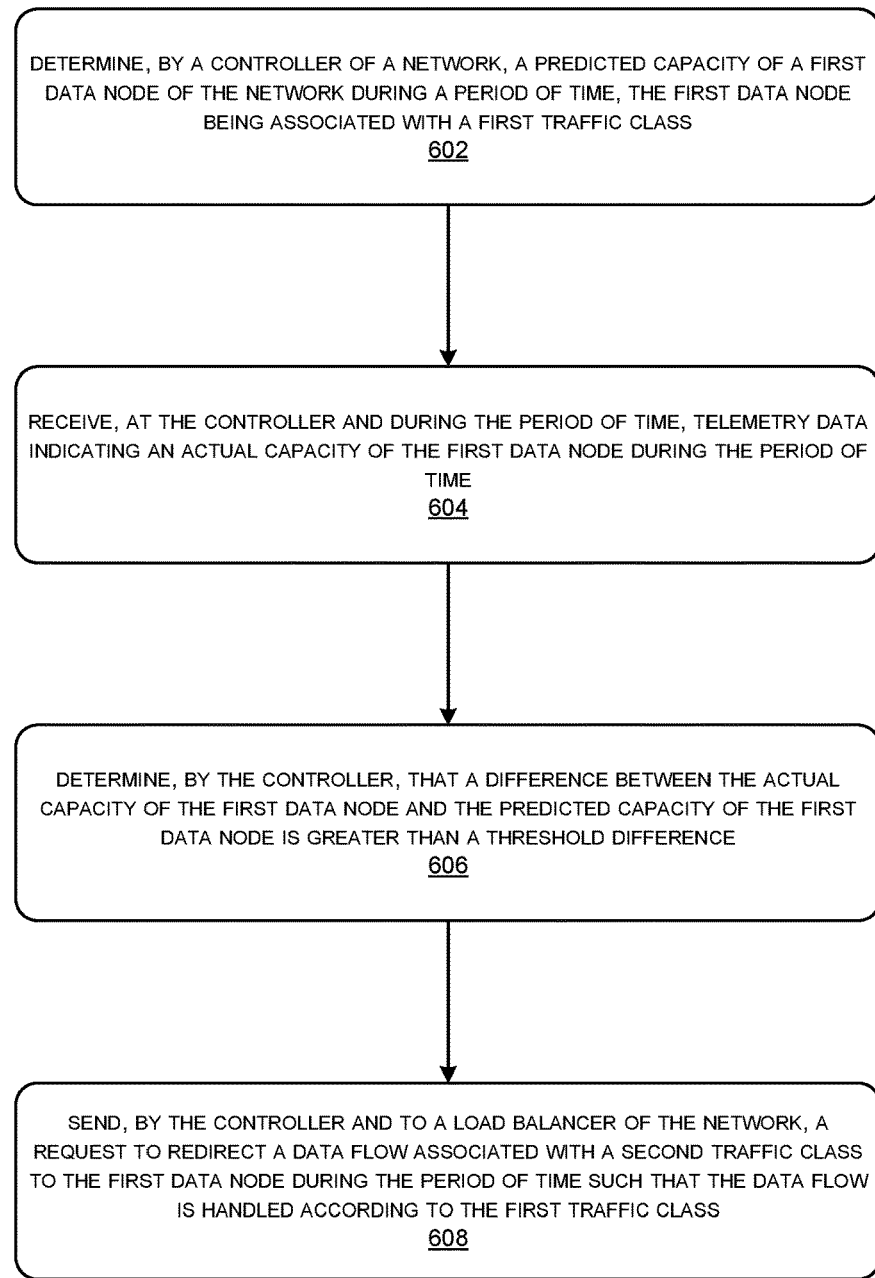
FIG. 6 illustrates a logic flow diagram of an example method for dynamic traffic class upgrading that may be performed at least partially by a controller of a network.

FIGS. 5 and 6 illustrate logic flow diagrams of various example methods associated with the technologies presented herein for load balancing encrypted traffic based on SPI values. The logical operations described herein with respect to FIGS. 5 and 6 may be implemented (1) as a sequence of computer-implemented acts or program modules running on a computing system and/or (2) as interconnected machine logic circuits or circuit modules within a computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 5 and 6, and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 5 illustrates a logic flow diagram of an example method 500 for dynamic load adjustment that may be performed at least partially by a data node of a network, such as one of the data nodes 116. The method 500 begins at operation 502, which includes determining, by a data node of a network, a predicted capacity of the data node during a period of time. For instance, the data node 116(1) of the networked environment 102 may determine its predicted capacity during a period of time (e.g., from 5:00 PM to 8:00 PM on a Friday).

At operation 504, the method 500 includes sending, to a load balancer of the network, an indication of the predicted capacity to prompt the load balancer to send a first number of data flows to the data node during the period of time. For instance, the data node 116(1) may send the indication of the predicted capacity to the load balancer 114(1). In response to receiving the indication, the load balancer 114(1) may send a first number of data flows of data-plane traffic 130 to the data node 116(1) during the period of time (e.g., starting at 5:00 PM on Friday).

At operation 506, the method 500 includes determining, by the data node and during the period of time, a difference between the predicted capacity of the data node and an actual capacity of the data node. For instance, the data node 116(1) may determine the difference between the predicted capacity of the data node during the period of time (e.g., 5:00 PM to 8:00 PM on Friday) and the actual capacity of the data node measured at some instance of time during the period of time (e.g., at 5:15 PM on Friday).

At operation 508, the method 500 includes, based at least in part on the difference, prompting the load balancer to send a second number of the data flows to the data node during the period of time. For instance, the data node 116(1) may prompt the load balancer 114(1) to send the second number of the data flows to the data node 116(1) during the period of time (e.g., from 5:00 PM to 8:00 PM on Friday). In some examples, the second number of the data flows may be less than the first number of the data flows in order to decrease the load of the data node 116(1). In other examples, the second number of the data flows may be greater than the first number of the data flows in order to increase the load of the data node 116(1).

FIG. 6 illustrates a logic flow diagram of an example method 600 for dynamic traffic class upgrading that may be performed at least partially by a controller of a network, such as the controller 124 of the networked environment 102. The method 600 begins at operation 602, which includes determining, by a controller of a network, a predicted capacity of a first data node of the network during a period of time, the first data node being associated with a first traffic class. For instance, the controller 124 may determine a predicted capacity of a first data node 116(1) during a period of time (e.g., from 5:00 PM to 8:00 PM on a Friday).

At operation 604, the method 600 includes receiving, at the controller and during the period of time, telemetry data indicating an actual capacity of the first data node during the period of time. For instance, the controller 124 may receive telemetry data 306 from the data nodes 116, and the telemetry data 306 may indicate the actual capacity of each of the data nodes 116 of the networked environment 102 during the period of time (e.g., at 5:15 PM on Friday).

At operation 606, the method 600 includes determining, by the controller, that a difference between the actual capacity of the first data node and the predicted capacity of the first data node is greater than a threshold difference. For example, the controller 124 may determine that the difference between the actual capacity of the first data node 116(1) and the predicted capacity is greater than the threshold difference. In some instances, the threshold difference may be a percentage of available computing resources and/or capacity of the data nodes 116. For example, the threshold difference may be that at least 40%, 50%, 60%, etc. of resources of a data node are available.

At operation 608, the method 600 includes sending, by the controller and to a load balancer of the network, a request to redirect a data flow associated with a second traffic class to the first data node during the period of time such that the data flow is handled according to the first traffic class. For instance, the controller 124 may send the request to the load balancer 114(1). In response, the load balancer 114(1) may redirect the data flow associated with the second traffic class to the data node 116(1), which may be associated with the first traffic class. For instance, the data flow may have been previously sent to the data node 116(N), which may be associated with the second traffic class, and the load balancer 114(1) may redirect that data flow to the data node 116(1) during the period of time.

Figure 7:
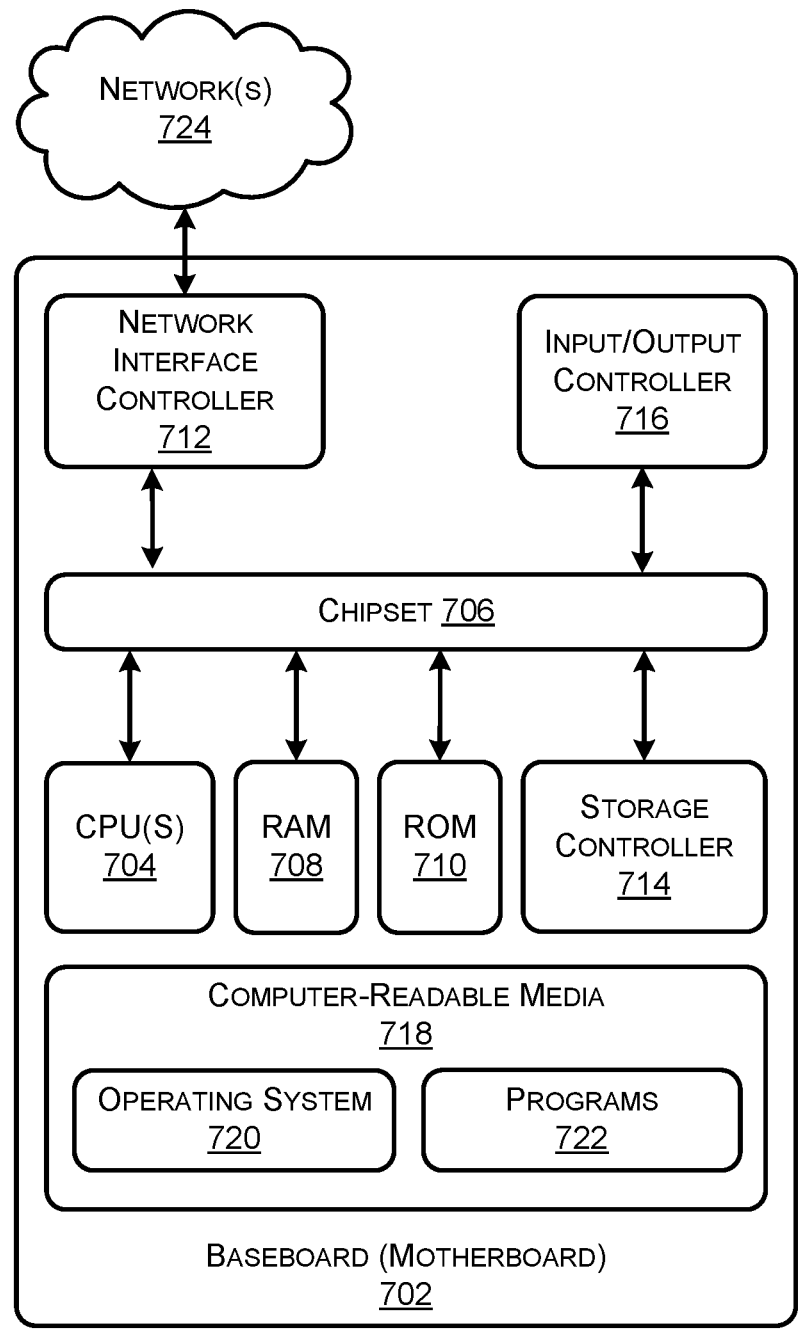
FIG. 7 illustrates a schematic view of an example computer-hardware architecture for implementing a network node and/or computing device, such as a load balancer, control node, data node, controller, etc. that can be utilized to implement aspects of the various technologies presented herein.

FIG. 7 is a schematic view of an example computer-hardware architecture for implementing a network node and/or computing device, such as a load balancer 114, control node 118, data node 116, controller 124, etc. that can be utilized to implement aspects of the various technologies presented herein. The computer architecture shown in FIG. 7 illustrates a conventional server computer, network device, workstation, desktop computer, laptop, tablet, network appliance, e-reader, smartphone, and/or other computing device, and can be utilized to execute any of the software components presented herein. The computer 700 may comprise networked devices such as servers, switches, routers, hubs, bridges, gateways, modems, repeaters, access points, etc.

The computer 700 includes a baseboard 702, or "motherboard," which is a printed circuit board to which a multitude of components or devices can be connected by way of a system bus or other electrical communication paths. In one illustrative configuration, one or more central processing units ("CPUs") 704 operate in conjunction with a chipset 706. The CPUs 704 can be standard programmable processors that perform arithmetic and logical operations necessary for the operation of the computer 700.

The CPUs 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 can provide an interface to a RAM 708, used as the main memory in the computer 700. The chipset 706 can further provide an interface to a computer-readable storage medium such as a read-only memory ("ROM") 710 or non-volatile RAM ("NVRAM") for storing basic routines that help to startup the computer 700 and to transfer information between the various components and devices. The ROM 710 or NVRAM can also store other software components necessary for the operation of the computer 700 in accordance with the configurations described herein.

The computer 700 can operate in a networked environment using logical connections to remote computing devices and computer systems through a network, such as the network(s) 108 and/or the network(s) 724. The chipset 706 can include functionality for providing network connectivity through a NIC 712, such as a gigabit Ethernet adapter. The NIC 712 is capable of connecting the computer 700 to other computing devices over the network. It should be appreciated that multiple NICs 712 can be present in the computer 700, connecting the computer to other types of networks and remote computer systems. In some examples, the NIC 712 may be configured to perform at least some of the techniques described herein and may include components for performing the techniques described herein.

The computer 700 can be connected to a storage device 718 that provides non-volatile storage for the computer. The storage device 718 can store an operating system 720, programs 722, and data, which have been described in greater detail herein. The storage device 718 can be connected to the computer 700 through a storage controller 714 connected to the chipset 706. The storage device 718 can consist of one or more physical storage units. The storage controller 714 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 700 can store data on the storage device 718 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 718 is characterized as primary or secondary storage, and the like.

For example, the computer 700 can store information to the storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 can further read information from the storage device 718 by detecting the physical states or characteristics of one or more particular locations within the physical storage units.

In addition to the mass storage device 718 described above, the computer 700 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 700. In some examples, the operations performed by the system-architecture 100 and or any components included therein, may be supported by one or more devices similar to computer 700. Stated otherwise, some or all of the operations performed by the system-architecture 100, and or any components included therein, may be performed by one or more computer devices 700 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 718 can store an operating system 720 utilized to control the operation of the computer 700. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 718 can store other system or application programs and data utilized by the computer 700.

In one embodiment, the storage device 718 or other computer-readable storage media is encoded with computer-executable instructions which, when loaded into the computer 700, transform the computer from a general-purpose computing system into a special-purpose computer capable of implementing the embodiments described herein. These computer-executable instructions transform the computer 700 by specifying how the CPUs 704 transition between states, as described above. According to one embodiment, the computer 700 has access to computer-readable storage media storing computer-executable instructions which, when executed by the computer 700, perform the various processes described above with regard to FIGS. 1-6. The computer 700 can also include computer-readable storage media having instructions stored thereupon for performing any of the other computer-implemented operations described herein.

The computer 700 can also include one or more input/output controllers 716 for receiving and processing input from a number of input devices, such as a keyboard, a mouse, a touchpad, a touch screen, an electronic stylus, or other type of input device. Similarly, an input/output controller 716 can provide output to a display, such as a computer monitor, a flat-panel display, a digital projector, a printer, or other type of output device. It will be appreciated that the computer 700 might not include all of the components shown in FIG. 7, can include other components that are not explicitly shown in FIG. 7, or might utilize an architecture completely different than that shown in FIG. 7.

As described herein, the computer 700 may comprise one or more of data nodes, control nodes, firewall nodes, edge routers, and/or key-value stores. The computer 700 may include one or more hardware processors 704 (processors) configured to execute one or more stored instructions. The processor(s) 704 may comprise one or more cores. Further, the computer 700 may include one or more network interfaces (e.g., NIC 712) configured to provide communications between the computer 700 and other devices over a network, such as the network(s) 108 and/or 724. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 722 may comprise any type of programs or processes to perform the techniques described in this disclosure for dynamically load balancing traffic based on predicted and actual load capacities of backend server nodes, as well as dynamically upgrading traffic classes of data flows based on available resources of data nodes.

While the invention is described with respect to the specific examples, it is to be understood that the scope of the invention is not limited to these specific examples. For instance, while many of the examples are described with respect to IPsec protocols, it should be understood that the techniques described are applicable to other protocols. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
   determining, by a data node associated with a cloud-delivered virtual private network (VPN) system, a predicted capacity of the data node during a period of time, the data node configured to process data plane traffic flowing through the cloud-delivered VPN system;
   sending, by the data node and to a load balancer associated with the cloud-delivered VPN system, an indication of the predicted capacity to cause the load balancer to send a first number of flows of the data plane traffic to the data node during the period of time;
   determining, by the data node and during the period of time, a difference between the predicted capacity of the data node and an actual capacity of the data node; and
   based at least in part on the difference, causing, by the data node, the load balancer to send a second number of the flows of the data plane traffic to the data node during the period of time to reduce the difference.

2. The method of claim 1, wherein the predicted capacity of the data node is determined based at least in part on utilization history associated with the data node.

3. The method of claim 1, wherein the second number of the flows is either one of greater than the first number of the flows or less than the first number of the flows.

4. The method of claim 1, wherein the difference comprises a first difference and the period of time comprises a first period of time, the method further comprising:
   determining, by the data node and during a second period of time that is subsequent to the first period of time, a second difference between the actual capacity of the data node and the second number of the flows; and
   based at least in part on the second difference, causing, by the data node, the load balancer to send a third number of the flows of the data plane traffic to the data node during the second period of time.

5. The method of claim 4, wherein:
   the second number of the flows is either one of greater than the first number or less than the first number, and
   the third number of the flows is either one of greater than the second number or less than the second number.

6. The method of claim 1, wherein at least one of the predicted capacity or the actual capacity are indicative of a number of available computing resources of a host associated with the data node, the available computing resources comprising at least one of memory or processing units.

7. The method of claim 1, wherein the data node is distinguishable from a control node associated with the cloud-delivered VPN system, the control node configured to process control plane traffic associated with the cloud-delivered VPN system.

8. A system associated with a data node of a cloud-delivered virtual private network (VPN) headend service, the data node configured to process data plane traffic flowing through the cloud-delivered VPN headend service, the system comprising:
   one or more processors; and
   one or more non-transitory computer-readable media storing instructions that, when executed by the one or more processors, cause the data node to perform operations comprising:
      determining a predicted capacity of the data node during a period of time;
      sending, to a load balancer of the cloud-delivered VPN headend service, an indication of the predicted capacity to cause the load balancer to send a first number of flows of the data plane traffic to the data node during the period of time;
      determining, during the period of time, a difference between the predicted capacity of the data node and an actual capacity of the data node; and
      based at least in part on the difference, causing the load balancer to send a second number of the flows of the data plane traffic to the data node during the period of time to reduce the difference.

9. The system of claim 8, wherein the predicted capacity is determined based at least in part on utilization history associated with the data node.

10. The system of claim 8, wherein the second number of the flows is either one of greater than the first number of the flows or less than the first number of the flows.

11. The system of claim 8, wherein the difference comprises a first difference and the period of time comprises a first period of time, the operations further comprising:
    determining, during a second period of time that is subsequent to the first period of time, a second difference between the actual capacity of the data node and the second number of the flows; and
    based at least in part on the second difference, causing the load balancer to send a third number of the flows to the data node during the second period of time.

12. The system of claim 11, wherein:
    the second number of the flows is either one of greater than the first number or less than the first number, and
    the third number of the flows is either one of greater than the second number or less than the second number.

13. The system of claim 8, wherein at least one of the predicted capacity or the actual capacity are indicative of a number of available computing resources of a host associated with the data node, the available computing resources comprising at least one of memory or processing units.

14. The system of claim 8, wherein the data node is distinguishable from a control node associated with the cloud-delivered VPN headend service, the control node configured to process control plane traffic associated with the cloud-delivered VPN headend service.

15. One or more non-transitory computer-readable media storing instructions that, when executed by one or more processors associated with a data node of a cloud-delivered virtual private network (VPN) system, cause the data node to perform operations comprising:
   determining a predicted capacity of the data node during a period of time, the predicted capacity determined based at least in part on a utilization history associated with the data node;
   sending, to a load balancer of the cloud-delivered VPN system, an indication of the predicted capacity to cause prompt the load balancer to send a first number of flows of data plane traffic to the data node during the period of time;
   determining, during the period of time, a metric indicative of a difference between the predicted capacity of the data node and an actual capacity of the data node; and
   based at least in part on the difference being greater than a threshold difference, prompting sending, to the load balancer, an indication of the metric for use in a load balancing algorithm to cause the load balancer to send a second number of the flows of data plane traffic to the data node during the period of time to reduce the difference.

16. The one or more non-transitory computer-readable media of claim 15, wherein the difference comprises a first difference and the period of time comprises a first period of time, the operations further comprising:
   determining, during a second period of time that is subsequent to the first period of time, a second difference between the actual capacity of the data node and the second number of the flows; and
   based at least in part on the second difference, prompting the load balancer to send a third number of the flows to the data node during the second period of time.

17. The one or more non-transitory computer-readable media of claim 16, wherein:
   the second number of the flows is either one of greater than the first number or less than the first number, and
   the third number of the flows is either one of greater than the second number or less than the second number.

18. The one or more non-transitory computer-readable media of claim 15, wherein the difference comprises a first difference and the period of time comprises a first period of time, the operations further comprising:
   determining, during a second period of time that is subsequent to the first period of time, a second difference between the actual capacity of the data node and the second number of the flows; and
   based at least in part on the second difference being less than the threshold difference, refraining from causing the load balancer to send a third number of the flows to the data node during the second period of time.

19. The one or more non-transitory computer-readable media of claim 15, wherein at least one of the predicted capacity or the actual capacity are indicative of a number of available computing resources of a host associated with the data node, the available computing resources comprising at least one of memory or processing units.

20. The one or more non-transitory computer-readable media of claim 15, wherein the data node is distinguishable from a control node associated with the cloud-delivered VPN system, the control node configured to process control plane traffic associated with the cloud-delivered VPN system.

* * * * *